(12) United States Patent
Madej et al.

(10) Patent No.: US 7,980,470 B2
(45) Date of Patent: Jul. 19, 2011

(54) ADAPTIVE POWER MANAGEMENT IN IMAGING SYSTEMS

(75) Inventors: Dariusz J. Madej, Shoreham, NY (US); Igor Vinogradov, Oakdale, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 365 days.

(21) Appl. No.: 12/288,804

(22) Filed: Oct. 23, 2008

(65) Prior Publication Data
US 2010/0102130 A1     Apr. 29, 2010

(51) Int. Cl.
*G06K 7/10* (2006.01)
(52) U.S. Cl. ........... 235/462.06; 235/462.11; 235/462.2; 235/462.21; 235/462.41; 235/462.42
(58) Field of Classification Search ............. 235/462.06, 235/462.11, 462.2, 462.21, 462.41, 462.42
See application file for complete search history.

(56) References Cited

U.S. PATENT DOCUMENTS

| | | | | |
|---|---|---|---|---|
| 5,280,162 A | * | 1/1994 | Marwin | 235/462.31 |
| 5,659,761 A | * | 8/1997 | DeArras et al. | 713/300 |
| 7,028,905 B2 | * | 4/2006 | Sato et al. | 235/462.45 |
| 2004/0020990 A1 | * | 2/2004 | Havens et al. | 235/472.01 |

FOREIGN PATENT DOCUMENTS
EP    0424976    5/1991

OTHER PUBLICATIONS
International Search Report and Written Opinion dated Jun. 1, 2010 in related case PCT/US2009/06449.

* cited by examiner

*Primary Examiner* — Michael G Lee
*Assistant Examiner* — Kristy A Haupt

(57) ABSTRACT

An imaging system for, and a method of, electro-optically reading targets, utilize an energizable illuminator for illuminating an illuminated target with illumination light, a solid-state, energizable imager having an array of image sensors for capturing return light from the illuminated target over a field of view, and for generating electrical signals indicative of the captured return light, and a controller for energizing the illuminator and the imager to process the electrical signals into data indicative of the illuminated target. A power reducer is operatively connected to the controller, for adaptively reducing electrical power consumption of the illuminator and/or the controller based on system usage.

17 Claims, 6 Drawing Sheets

ADAPTIVE POWER MANAGEMENT IN IMAGING SYSTEMS

DESCRIPTION OF THE RELATED ART

Solid-state imaging systems, in both handheld and hands-free active reading modes of operation, have been used in supermarkets, warehouse clubs, department stores, and other kinds of retailers for many years, to electro-optically read targets, such as one-dimensional bar code symbols, particularly of the Universal Product Code (UPC) type, each having a row of bars and spaces spaced apart along one direction, and two-dimensional symbols, such as Code 39, which introduced the concept of vertically stacking a plurality of rows of bar and space patterns in a single symbol, as described in U.S. Pat. No. 4,794,239. Another two-dimensional code structure for increasing the amount of data that can be represented or stored on a given amount of surface area is known as PDF417 and is described in U.S. Pat. No. 5,304,786.

The solid-state imaging system has also been used to capture images or pictures of a non-symbol target, and include an imager having a one- or two-dimensional array of cells or photosensors, which correspond to image elements or pixels in a field of view of the imager. Such an imager may include a one- or two-dimensional charge coupled device (CCD) or a complementary metal oxide semiconductor (CMOS) device, and is analogous to the imager used in a digital consumer camera to capture images.

The imaging system further typically includes an illuminator to illuminate the target during its active reading mode with illumination light emitted from an illumination light source and directed to the target for reflection therefrom. The illumination light source may be located within and/or externally of the system, and typically comprises one or more light emitting diodes (LEDs). To assist an operator in reading a desired target, the imaging system is often equipped with an aiming assembly having an aiming laser for generating a laser beam, and optics for generating a visible aiming pattern, such as a "crosshair" pattern, from the laser beam. The operator trains the aiming pattern on the target to be imaged during an aiming mode prior to the active reading read. The system yet further includes electronic circuitry for processing electrical signals generated by the imager and indicative of the return light captured by the array, and a microprocessor for decoding the electrical signals to read each captured image.

It is therefore known to use a solid-state imaging system for capturing a monochrome image of a symbol as, for example, disclosed in U.S. Pat. No. 5,703,349. It is also known to use a solid-state imaging system with multiple buried channels for capturing a full color image of the target as, for example, disclosed in U.S. Pat. No. 4,613,895. It is common to provide a two-dimensional CCD with a 640×480 resolution commonly found in VGA monitors, although other resolution sizes are possible.

In the hands-free active reading mode, the operator may slide or swipe a product bearing a target symbol past a window of the system in either horizontal and/or vertical and/or diagonal directions, in a "swipe" mode. Alternatively, the operator may present the symbol on the product to an approximate central region of the window in a "presentation" mode. The choice depends on operator preference or on the layout of a workstation in which the system is used.

In the handheld active reading mode, the operator holds the system in his or her hand during reading and aims the system at the target symbol to be read. The operator may first lift the system from a countertop or a support cradle. Once reading is completed, the operator may return the system to the countertop or to the support cradle.

Although the known imaging system is generally satisfactory for its intended purpose, excessive electrical power consumption is a concern. The aforementioned imager, the illumination light source, the aiming laser, the electronic circuitry, and the microprocessor, among other electrical components in the system, all draw electrical current and consume power during the active reading mode. Typically, the microprocessor running at full clock speed and the illumination light source running at full power consume the most power during the active reading mode. If the system is powered by an on-board battery, then excessive power consumption rapidly drains the battery and shortens the working lifetime of the system. If the system is USB powered rather than battery powered, then the USB interface imposes limits on how much power could be drawn, and power reduction becomes an essential need. A high speed microprocessor running at a full clock speed generates a lot of heat, and thus reducing power consumption becomes a critical factor to improving heat dissipation and preventing overheating of the imaging system.

It is known in the art to reduce power consumption by powering the system down after a fixed time period of system inactivity. For example, if a target has not been read after a few predetermined minutes, then the system is considered inactive, and the microprocessor powers the system down to an "idle mode" in which the system is not continuously powered, but instead, is intermittently operated at a so-called constant "blink" frequency, for example, once per second, in which some of the components, such as the imager and the illuminator, are periodically energized by the microprocessor. Power is conserved between the periodic predetermined energizations, when at least the imager and the illuminator are turned off.

It is also known in the art to further reduce power consumption by powering the system down to a "sleep mode" after the system has been in the idle mode for a fixed predetermined time period, for example, after one hour or longer has elapsed. In the sleep mode, virtually all the electrical components in the system are turned off, thereby conserving power.

These known power savings modes do reduce power, but have proven to be problematic. The periodic predetermined energizations or blinking of the illuminator in the idle mode is not always welcome and is especially annoying to the operator and/or to consumers who must tolerate a bright light flashing, once per second, in front of their eyes for an hour or so. In addition, power is still unnecessarily wasted by the periodic energizations at a frequent, constant blink frequency in the idle mode, and also by periodic energizing the system for a rather long, fixed time period of an hour or so before entering the sleep mode. The operation during these known power savings modes is fixed in advance and is not adapted to the actual or expected usage of the system. A more intelligent power management is therefore desirable and needed.

SUMMARY OF THE INVENTION

One feature of the present invention resides, briefly stated, in all imaging system for, and a method of, electro-optically reading targets, such as bar code symbols. The system preferably includes a housing, and an energizable illuminator supported by the housing for illuminating an illuminated target with illumination light. Preferably, the illuminator includes a plurality of light emitting diodes (LEDs). A solid-state, energizable imager is also supported by the housing and has an array of image sensors for capturing return light from the illuminated target over a field of view, and for generating electrical signals indicative of the captured return light. Preferably, the array is a CCD or a CMOS array. A controller, preferably a programmed microprocessor, is operative for energizing the illuminator and the imager to process the electrical signals into data indicative of the illuminated target.

In accordance with the present invention, a power reducer is operatively connected to the controller, for adaptively reducing electrical power consumption of at least one of the illuminator and the controller, as well as preferably other electrical components of the system, based on system usage. In one embodiment, the power reducer is a manually actuated switch operatively connected to the controller, for operating the system in a sleep mode in which the controller deenergizes, either fully or partially, at least one of the illuminator and the controller, if not both, when the switch is manually actuated. In the event that a trigger is provided on the housing, then it is advantageous if the manually actuated switch for reducing power is the trigger. The trigger is normally manually actuated for a reading time period, for example, one second or less, to initiate an active reading mode. To use the trigger as the switch for reducing power, the trigger is manually actuated for a shutdown time period, for example, three seconds, which is longer than the reading time period to initiate the sleep mode. This helps alleviate the prior art problem of having the illuminator flash for a long time period, thereby wasting power.

In another embodiment, the power reducer is a timer, a motion sensors or a program for operating the controller to periodically adjustably deenergize, either fully or partially, at least one of the illuminator and the controller, if not both, as well as preferably other electrical components of the system, in an idle mode in which the system is inactive, at a variable frequency that decreases over time. For example, the controller can be preprogrammed to adjustably set the frequency at the beginning of the idle mode at a relatively high value, such as 100 milliseconds, and then the controller after continued inactivity can gradually reduce the frequency to a relatively lower value, such as 10 seconds or more. This helps alleviate the prior art problem of having the illuminator flash at the same frequency.

In still another embodiment, the power reducer is a timer for measuring inactive time periods between reading the targets, and for operating the controller to periodically adjustably deenergize, either fully or partially, at least one of the illuminator and the controller, if not both, as well as preferably other electrical components of the system, in an idle mode in which the system is inactive at a frequency that depends upon the measured inactive time periods. If the measured inactive time periods are short, then the frequency can be adjustably set at a higher rate. If the measured inactive time periods are long, then the frequency call be adjustably set at a lower rate. This helps alleviate the prior art problem of having the illuminator flash at the same frequency.

In yet another embodiment, the power reducer is a real time clock for timestamping active time periods in which the targets are read and inactive time periods in which no targets are read over time, and for operating the controller to periodically adjustably energize, either fully or partially, at least one of the illuminator and the controller, if not both, as well as preferably other electrical components of the system, during the timestamped active time periods, and to periodically deenergize, either fully or partially, at least one of the illuminator and the controller, if not both, as well as preferably other electrical components of the system, during the timestamped inactive time periods. The clock can be programmed by a remote host operatively connected to the controller, either by a wired or wireless link, as a look-up table, where, for each time of a day, the frequency is a specified value. The controller or host can collect usage statistics over a few days, and thus learn when the busy and non-busy times are, and accordingly adaptively adjust the frequency.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
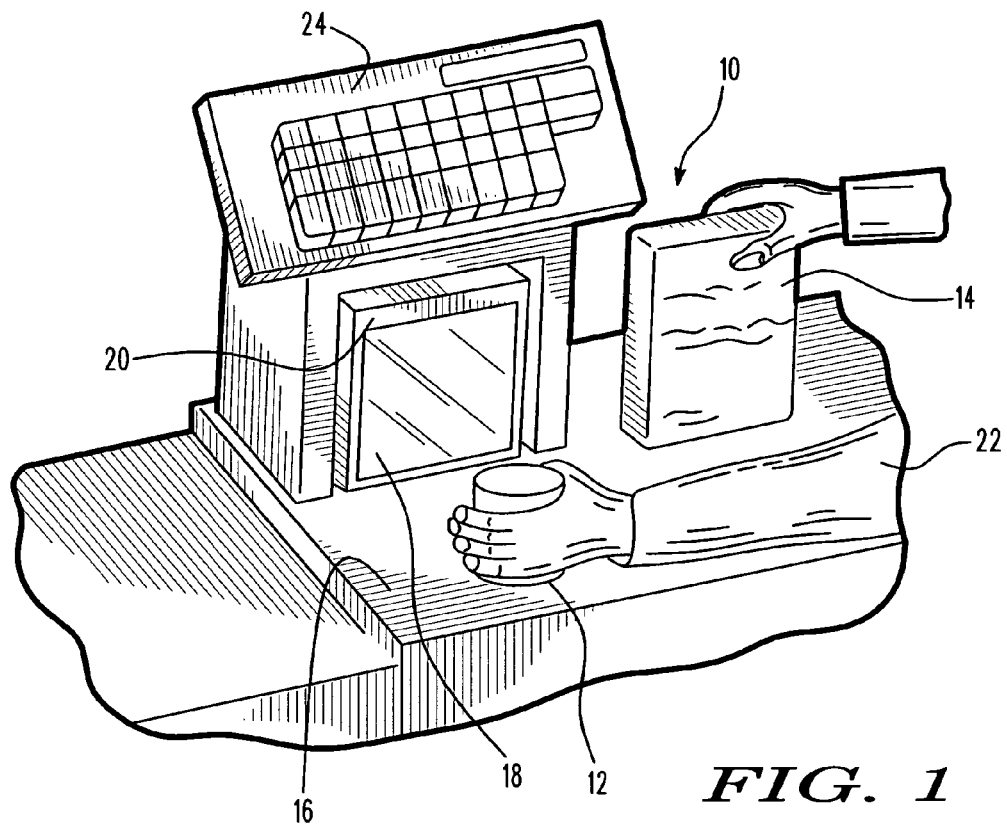
FIG. 1 is a perspective view of a portable imaging system operative in an active hands-free reading mode for capturing light from targets to be electro-optically read.

Reference numeral 10 in FIG. 1 generally identifies a workstation for processing transactions and specifically a checkout counter at a retail site at which products, such as a can 12 or a box 14, each bearing a target symbol, are processed for purchase. The counter includes a countertop 16 across which the products are slid at a swipe speed past, or presented to, a generally vertical or upright planar window 18 of a portable, box-shaped, vertical slot reader or imaging system 20 mounted on the countertop 16. A checkout clerk or operator 22 is located at one side of the countertop, and the imaging system 20 is located at the opposite side. A host or cash/credit register 24 is located within easy reach of the operator. The operator 22 can also hold the imaging system 20 in one's hand during imaging.

Figure 2:
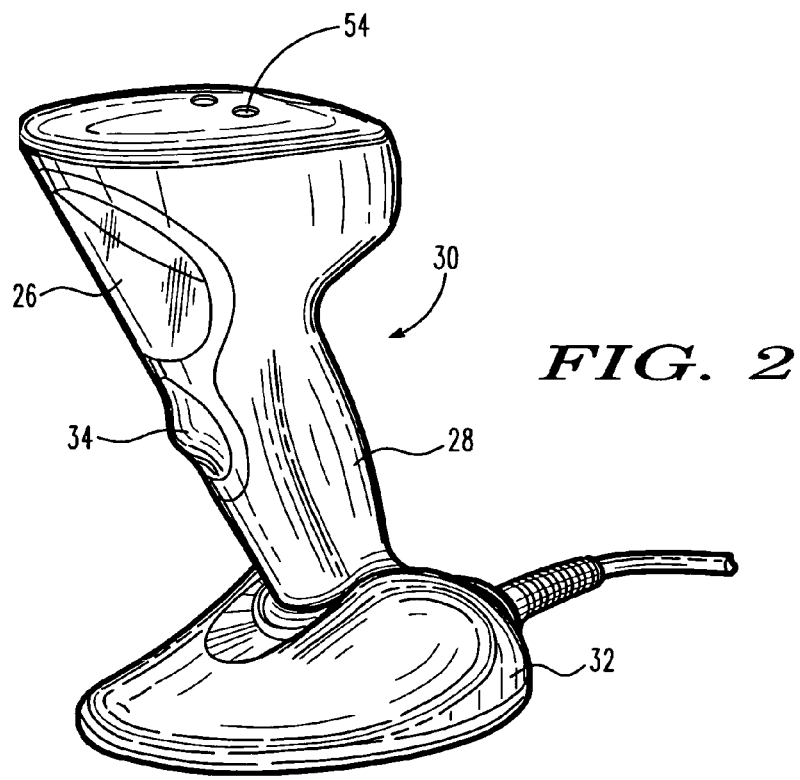
FIG. 2 is a perspective view of another portable imaging system operative in either an active hand-held reading mode, or an active hands-free reading mode, for capturing light from targets to be electro-optically read.

Reference numeral 30 in FIG. 2 generally identifies another imaging system having a different configuration from that of imaging system 20. Imaging system 30 also has a generally vertical or upright window 26 and a gun-shaped housing 28 supported by a base 32 for supporting the imaging system 30 on a countertop. The imaging system 30 can thus be used as a stationary workstation in which products are slid or swiped past, or presented to, the vertical window 26, or can be picked up off the countertop and held in the operator's hand and used as a handheld imaging system in which a trigger 34 is manually depressed to initiate imaging of a target. In another variation, the base 32 can be omitted.

Figure 3:
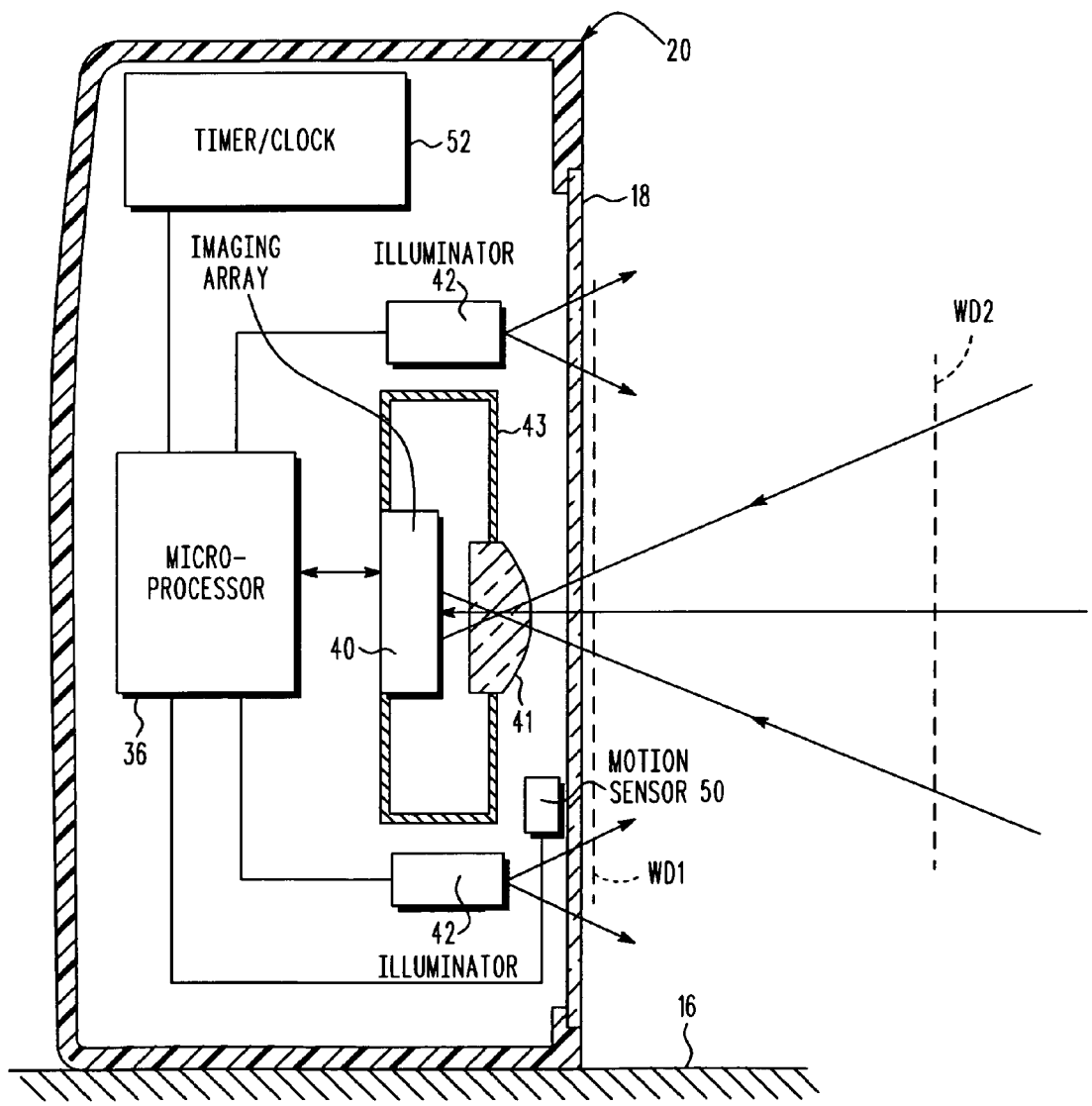
FIG. 3 is a schematic diagram of various components of the system of FIG. 1 in accordance with the present invention.

As schematically shown in FIG. 3, an imager 40 and a focusing lens assembly 41 are mounted in an enclosure 43 in either imaging system, such as the imaging system 20. The imager 40 is a solid-state device, for example, a CCD or a CMOS imager and has a one- or two-dimensional array of addressable image sensors operative for capturing light through the window 18 from a target, for example, a one- or two-dimensional symbol, or a non-symbol target, over a field of view. The non-symbol target can be virtually anything, such as a person, place, or thing whose picture is to be acquired. The targets are located anywhere in a working range of distances between a close-in working distance (WD1) and a far-out working distance (WD2). In a preferred embodiment, WD1 is about two inches from the imager array 40 and generally coincides with the window 18, and WD2 is about eight inches from the window 18. Typically, a symbol target is located relatively close to the window, whereas a non-symbol target is located relatively further away from the window. Of course, symbol targets can also be located relatively further away from the window.

An illuminator is also mounted in the imaging system and preferably includes a plurality of light sources, e.g., light emitting diodes (LEDs) 42, arranged to uniformly illuminate the field of view and the target therein. As shown in FIG. 3, the imager 40 and the illuminator LEDs 42 are operatively connected to a controller or microprocessor 36 operative for controlling the operation of these components. Preferably, the controller 36 is the same as the one used for decoding light scattered from the target symbols and for processing the captured target images. A motion sensor 50 faces the window 18 and is operative for detecting motion of a target brought into the field of view and, hence, serves as a target detector to detect the presence of the target. The motion sensor 50 could be a separate component as shown, or the imager 40 could serve that function by comparing captured images in successive frames.

In an active mode of operation, for example, when the trigger 34 is depressed, or when the motion sensor detects a target, the controller 36 sends a command signal to pulse the illuminator LEDs 42 at full power for a short time period, say 500 microseconds or less, and energizes the imager 40 to collect light from the target only during said time period. A typical array needs from 12 to 33 milliseconds to acquire the entire target image and operates at a frame rate of about 30 to 60 frames per second. The array may have on the order of one million addressable image sensors. Frequently, the illuminator LEDs 42 are pulsed for a few milliseconds, especially when working at extended ranges where it is difficult to illuminate the symbol target as brightly. Under these circumstances, the illumination may be activated for up to around 30 milliseconds.

In accordance with the present invention, a power reducer is operatively connected to the controller 36, for adaptively reducing electrical power consumption of at least one of the illuminator 42 and the controller 36, and preferably other electrical components of the system, based on system usage. In one embodiment, the power reducer is a manually actuated switch, such as switch 54 in FIG. 2, operatively connected to the controller 36, for operating the system in a sleep mode in which the controller 36 deenergizes, either fully or partially, at least one of the illuminator 42 and the controller 36, if not both, in a plurality of states, as described in detail below, and preferably other system components, when the switch 54 is manually actuated. In the event that the trigger 34 is provided on the housing, then it is advantageous if the manually actuated switch for reducing power is the trigger 34. The trigger 34 is normally manually actuated for a reading time period, for example, one second, to initiate the active reading mode. To use the trigger 34 as the switch for reducing power, the trigger 34 is manually actuated for a shutdown time period, for example, three seconds, which is longer than the reading time period to initiate the sleep mode. The motion sensor 50 or the imager 40 can be used to switch the system out of the sleep mode by detecting motion of a new target brought into the field of view.

In another embodiment, the power reducer is a timer 52 or program for operating the controller 36 to periodically adjustably deenergize, either fully or partially, at least one of the illuminator 42 and the controller 36, if not both, in a plurality of states, as described in detail below, and preferably other system components, in an idle mode in which the system is inactive at a variable frequency that decreases over time. For example, the controller 36 can be preprogrammed to adjustably set the frequency at the beginning of the idle mode at a relatively high value, such as 100 milliseconds, and then the controller 36 after continued inactivity can gradually reduce the frequency to a relatively lower value, such as 10 seconds or more. The motion sensor 50 or the imager 40 can be used to switch the system out of the idle mode by detecting motion of a new target brought into the field of view.

In still another embodiment, the power reducer is a clock or the timer 52 for measuring inactive time periods between reading the targets, and for operating the controller 36 to periodically adjustably deenergize, either fully or partially, at least one of the illuminator 42 and the controller 36, if not both, in a plurality of states, as described in detail below, and preferably other system components, in an idle mode in which the system is inactive at a frequency that depends upon the measured inactive time periods. If the measured inactive time periods are short, then the frequency can be adjustably set at a higher rate. If the measured inactive time periods are long, then the frequency can be adjustably set at a lower rate.

In yet another embodiment, the clock or the timer 52 is dynamically operative, in real time, for timestamping active time periods in which the targets are read and inactive time periods in which no targets are read over time, and for operating the controller 36 to periodically adjustably energize, either fully or partially, at least one of the illuminator 42 and the controller 36, if not both, in a plurality of states, as described in detail below, and preferably other system components, during the timestamped active time periods, and to periodically adjustably deenergize, either fully or partially, at least one of the illuminator 42 and the controller 36, if not both, in a plurality of states, as described in detail below, and preferably other system components, during the timestamped inactive time periods. The clock can be programmed by a remote host operatively connected to the controller 36, either by a wired or wireless link, as a look-up table, where, for each time of a day, the frequency is a specified value. The controller 36 can collect usage statistics over a few days, and thus learn when the busy and non-busy times are, and accordingly adaptively adjust the frequency.

Figure 4:
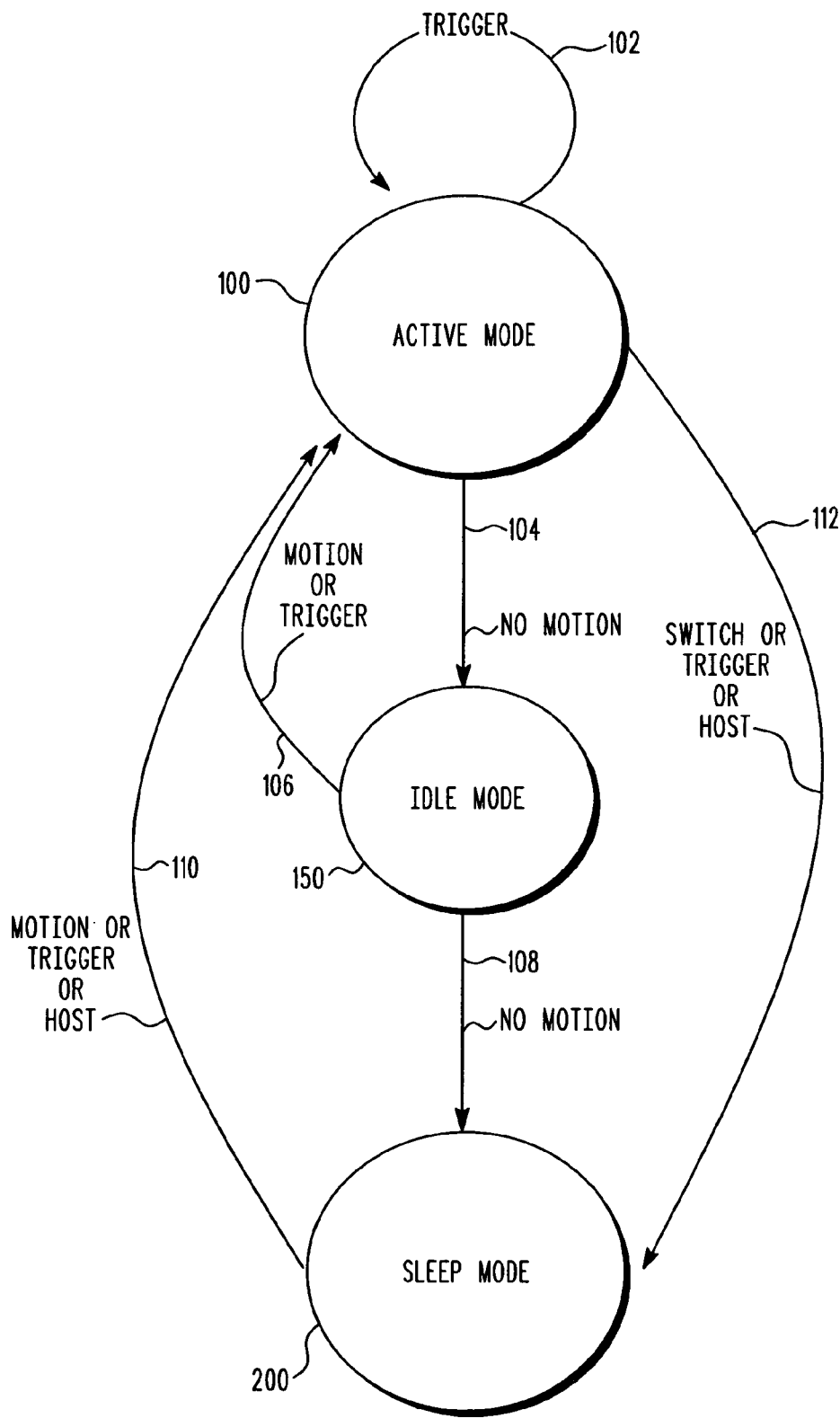
FIG. 4 is a power management diagram depicting active, idle and sleep modes of operation of the systems of FIG. 1 or FIG. 2 in accordance with the present invention.

FIG. 4 diagrammatically depicts the aforementioned active mode 100, the idle mode 150 and the sleep mode 200 of operation of the imaging system. The system reads a target by activating the trigger 34 (arrow 102) during the active mode 100 in which the controller 36 is running at full clock speed and the illuminator 42 is emitting its brightest light, and therefore a maximum amount of power is being consumed. If there is no target to be read and no motion detected by the sensor 50 or the imager 40 during the active mode 100 for a certain time (arrow 104), then the controller 36 operates the system in the idle mode 150. If motion is detected by the sensor 50 or the imager 40, or if the trigger 34 is depressed, during the idle mode 150, then the system can quickly be returned to the active mode (arrow 106). If there is still no target to be read and still no motion detected by the sensor 50 or the imager 40 during the idle mode 150 for a certain time (arrow 108), then the controller 36 operates the system in the steel) mode 200. If motion is detected by the sensor 50 or the imager 40, or if the trigger 34 is depressed, or if the host commands it, during the idle mode 150, then the system can quickly be returned to the active mode (arrow 110). Depression of the switch 54, or of the trigger 34 for the shutdown time period, or a command by the host quickly converts the system from the active mode 100 to the sleep mode 200, bypassing the idle mode 150 (arrow 112).

Figure 5:
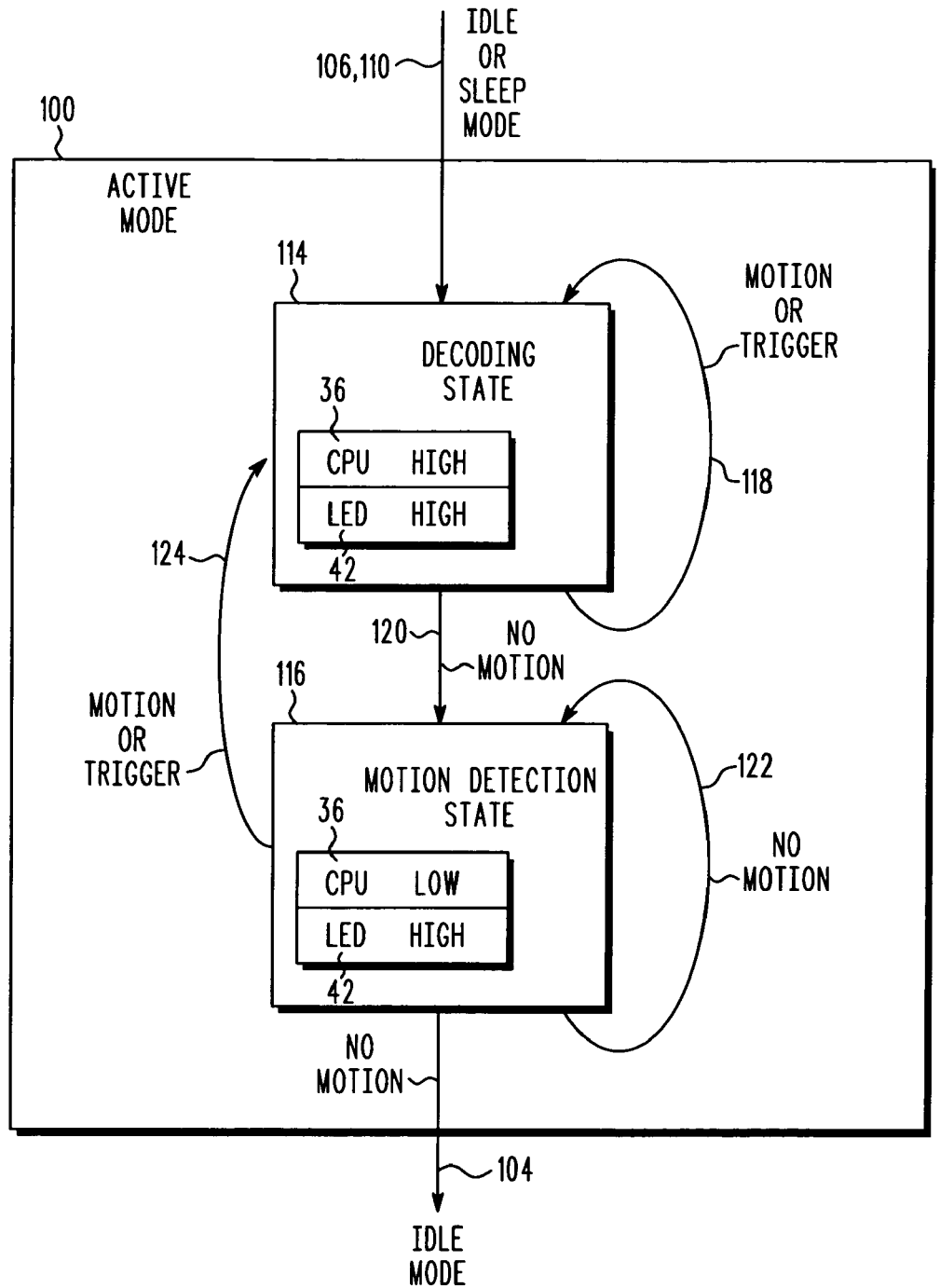
FIG. 5 is a detailed diagram depicting power reducing states in the active mode of FIG. 4 in accordance with the present invention.

FIG. 5 depicts that the active mode 100 includes a decoding state 114 and a motion detection state 116. For simplicity, the controller 36 is identified by the abbreviation "CPU" for central processing unit, and the illuminator 42 is identified by the abbreviation "LED" for light emitting diode, not only in FIG. 5, but in FIGS. 6 and 7 as well. In the decoding state 114, both the CPU 36 and the LED 42 run at full power (HIGH) until the target has been read, after which the CPU 36 runs at reduced power, and the LED is extinguished. The system can return to the decoding state 114 after a certain time, or if motion is detected, or the trigger 34 is depressed (arrow 118). After the target has been read, or if no motion has been detected, the system can immediately go into the motion detection state 116 (arrow 120) and wait for a new target. In the motion detection state 116, the CPU 36 runs at reduced power (LOW) and the LED 42 runs at full power (HIGH) and remains so if there is no motion for a certain time (arrow 122). If motion is detected, or if the trigger 34 is depressed, then the system will return to the decoding state 114 (arrow 124). If no motion is detected for a certain longer time (arrow 104), as described above, then the system goes to the idle mode 150.

Figure 6:
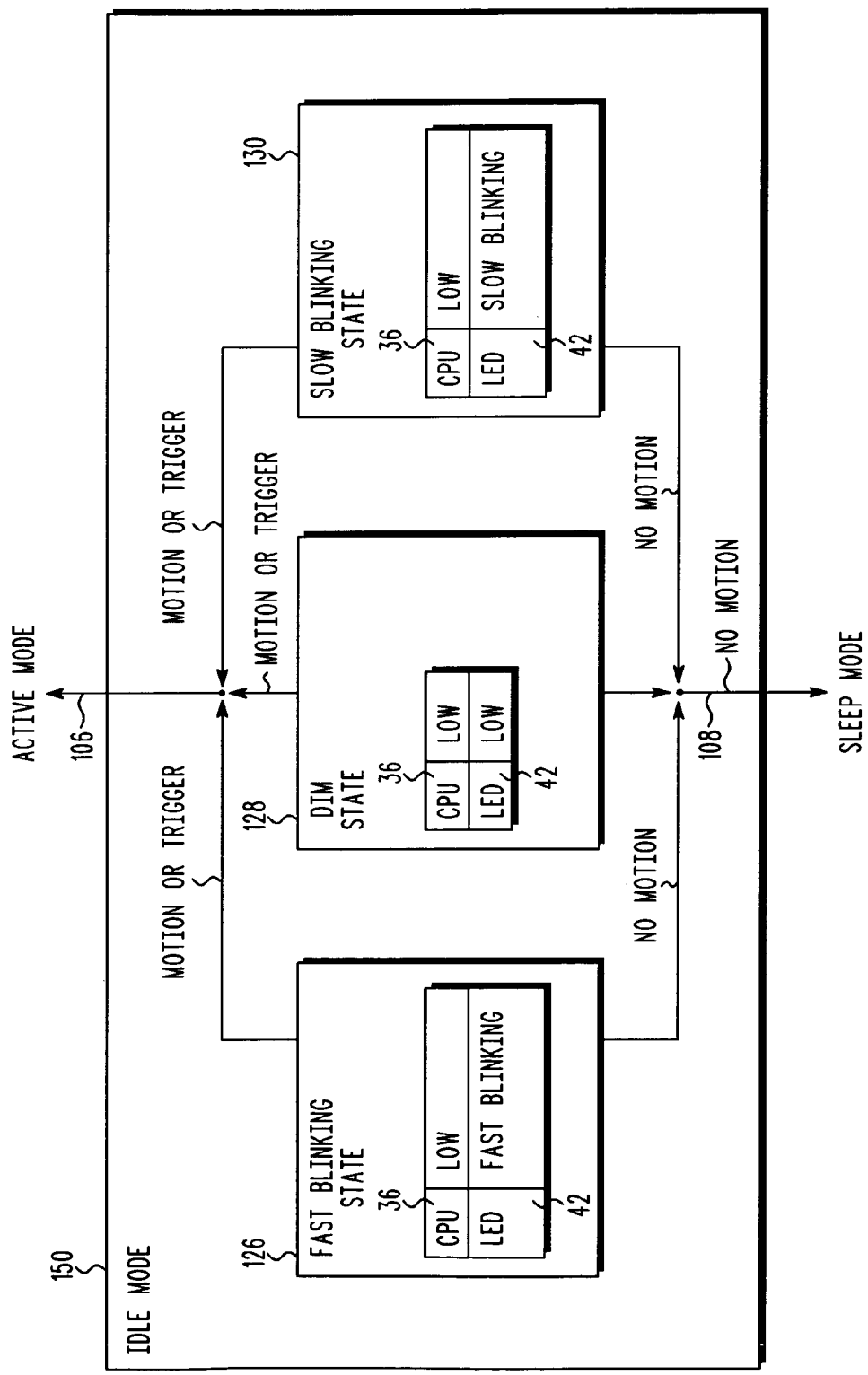
FIG. 6 is a detailed diagram depicting power reducing states in the idle mode of FIG. 4 in accordance with the present invention.

FIG. 6 depicts that the idle mode 150 includes a fast blinking state 126, a dim state 128 and a slow blinking state 130. In each state of the idle mode 150, the CPU 36 runs at reduced power (LOW). In the dim state 128, the LED 42 runs at reduced power (LOW). In the fast blinking state 126, the LED 42 runs at a fast blinking frequency or duty cycle. In the slow blinking state 130, the LED 42 runs at a slower blinking frequency or duty cycle. Instead of changing the blinking frequency, the LED 42 could be varied in drive current and brightness. If motion is detected, or if the trigger 34 is depressed, in any of states of the idle mode 150, then the system returns to the active mode 100, as described above (arrow 106). If no motion is detected, or if the trigger 34 is not depressed, in any of states of the idle mode 150, then the system goes to the sleep mode 200, as described above (arrow 108).

Figure 7:
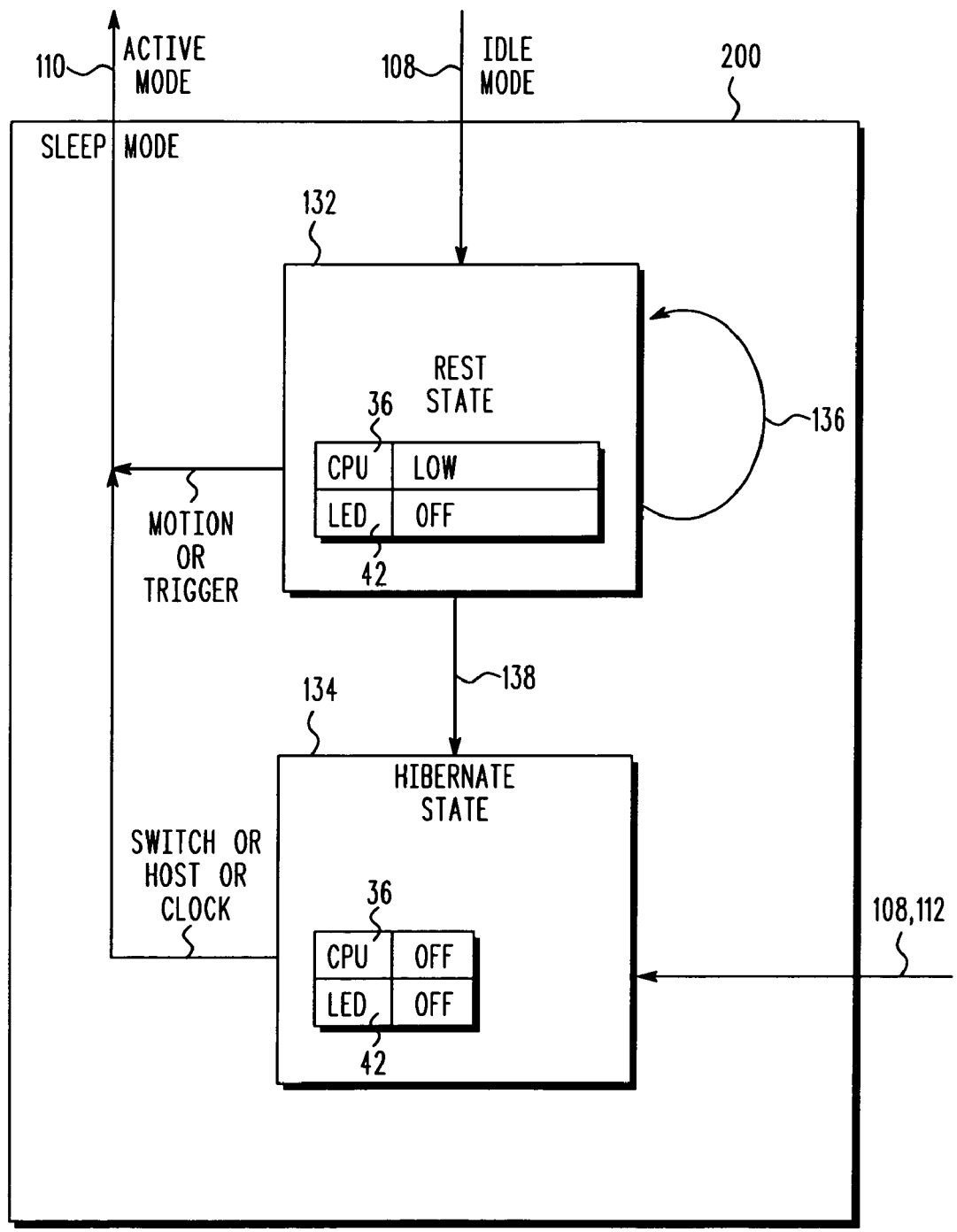
FIG. 7 is a detailed diagram depicting power reducing states in the sleep mode of FIG. 4 in accordance with the present invention.

FIG. 7 depicts that the sleep mode 200 includes a rest state 132 and a hibernate state 134. In each state of the sleep mode 200, the LED 42 is turned off (OFF). In the rest state 132, the CPU runs at reduced power (LOW). In the hibernate state 134, the CPU 36 is turned off (OFF). The system will remain in the rest state 132 for a certain time (arrow 136), and go into the hibernate state 134 when that certain time has expired (arrow 138). If motion is detected, or if the trigger 34 is depressed, in the rest state 132, then the system returns to the active mode 100, as described above (arrow 110). If the switch 54 is depressed, or if the trigger 34 is depressed for the shutdown time, or if the host commands it, or if a clock generates a wake-up signal, in the hibernate state 134, then the system returns to the active mode 100, again as described above (arrow 110).

Each of the adjustable parameters described above, such as time periods and frequencies, are programmable. For example, the system can be programmed by the operator by having the system read special parameter symbols that enable the controller to self-configure itself in a calibration mode.

It will be understood that each of the elements described above, or two or more together, also may find a useful application in other types of constructions differing from the types described above. Thus, imaging systems having different configurations can be used. In the preferred embodiment, the imaging systems are mounted in handheld housings.

While the invention has been illustrated and described as adaptive power management in an imaging reader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:
1. An imaging system for electro-optically reading targets, comprising:
    an energizable illuminator for illuminating an illuminated target with illumination light;
    a solid-state, energizable imager having an array of image sensors for capturing return light from the illuminated target over a field of view, and for generating electrical signals indicative of the captured return light;
    a controller for energizing the illuminator and the imager to process the electrical signals into data indicative of the illuminated target;
    a power reducer operatively connected to the controller, for adaptively reducing electrical power consumption of at least one of the illuminator and the controller based on system usage; and
    wherein the power reducer is a timer for controlling the controller to periodically partially deenergize the at least one of the illuminator and the controller in an idle mode in which the system is inactive at a variable frequency that decreases over time.

2. The system of claim 1, wherein the illuminator includes a plurality of light emitting diodes (LEDs).

3. The system of claim 1, wherein the controller is operative for energizing the illuminator and the imager to process the electrical signals into data indicative of the illuminated target during an active mode, and wherein the power reducer is operative for partially reducing electrical power consumption during an idle mode and for more fully reducing electrical power consumption during a sleep mode, and wherein the controller is operative for configuring each mode with a plurality of states in each of which power is reduced to the at least one of the illuminator and the controller.

4. An imaging system for electro-optically reading targets, comprising:
    an energizable illuminator for illuminating an illuminated target with illumination light;
    a solid-state, energizable imager having an array of image sensors for capturing return light from the illuminated target over a field of view, and for generating electrical signals indicative of the captured return light;

a controller for energizing the illuminator and the imager to process the electrical signals into data indicative of the illuminated target;

a power reducer operatively connected to the controller, for adaptively reducing electrical power consumption of at least one of the illuminator and the controller based on system usage; and wherein the power reducer is a timer for measuring inactive time periods between reading the targets, and for controlling the controller to periodically partially deenergize the at least one of the illuminator and the controller in an idle mode in which the system is inactive at a frequency that depends upon the measured inactive time periods.

5. The system of claim 4, wherein the controller is operative for energizing the illuminator and the imager to process the electrical signals into data indicative of the illuminated target during an active mode, and wherein the power reducer is operative for partially reducing electrical power consumption during an idle mode and for more fully reducing electrical power consumption during a sleep mode, and wherein the controller is operative for configuring each mode with a plurality of states in each of which power is reduced to the at least one of the illuminator and the controller.

6. An imaging system for electro-optically reading targets, comprising:

an energizable illuminator for illuminating an illuminated target with illumination light;

a solid-state, energizable imager having an array of image sensors for capturing return light from the illuminated target over a field of view, and for generating electrical signals indicative of the captured return light;

a controller for energizing the illuminator and the imager to process the electrical signals into data indicative of the illuminated target;

a power reducer operatively connected to the controller, for adaptively reducing electrical power consumption of at least one of the illuminator and the controller based on system usage; and wherein the power reducer is a clock for timestamping active time periods in which the targets are read and inactive time periods in which no targets are read over time, and for controlling the controller to periodically energize the illuminator and the controller during the timestamped active time periods, and to periodically deenergize the at least one of the illuminator and the controller during the timestamped inactive time periods.

7. The system of claim 6, wherein the controller is operative for energizing the illuminator and the imager to process the electrical signals into data indicative of the illuminated target during an active mode, and wherein the power reducer is operative for partially reducing electrical power consumption during an idle mode and for more fully reducing electrical power consumption during a sleep mode, and wherein the controller is operative for configuring each mode with a plurality of states in each of which power is reduced to the at least one of the illuminator and the controller.

8. An imaging system for electro-optically reading targets, comprising:

means for illuminating an illuminated target with illumination light;

means for capturing return light from the illuminated target over a field of view, and for generating electrical signals indicative of the captured return light;

means for energizing the illuminating means and the capturing means to process the electrical signals into data indicative of the illuminated target;

means for adaptively reducing electrical power consumption of at least one of the illuminating means and the energizing means based on system usage; and wherein the power reducing means includes means for controlling the energizing means to periodically deenergize the at least one of the illuminating means and the energizing means in an idle mode in which the system is inactive at a variable frequency that decreases over time.

9. An imaging system for electro-optically reading targets, comprising:

means for illuminating an illuminated target with illumination light;

means for capturing return light from the illuminated target over a field of view, and for generating electrical signals indicative of the captured return light;

means for energizing the illuminating means and the capturing means to process the electrical signals into data indicative of the illuminated target;

means for adaptively reducing electrical power consumption of at least one of the illuminating means and the energizing means based on system usage; and wherein the power reducing means includes means for measuring inactive time periods between reading the targets, and for controlling the energizing means to periodically deenergize the at least one of the illuminating means and the energizing means in an idle mode in which the system is inactive at a frequency that depends upon the measured inactive time periods.

10. An imaging system for electro-optically reading targets, comprising:

means for illuminating an illuminated target with illumination light;

means for capturing return light from the illuminated target over a field of view, and for generating electrical signals indicative of the captured return light;

means for energizing the illuminating means and the capturing means to process the electrical signals into data indicative of the illuminated target;

means for adaptively reducing electrical power consumption of at least one of the illuminating means and the energizing means based on system usage; and wherein the power reducing means includes means for timestamping active time periods in which the targets are read and inactive time periods in which no targets are read over time, and for controlling the energizing means to periodically energize the illuminating means and the energizing means during the timestamped active time periods, and to periodically deenergize the at least one of the illuminating means and the energizing means during the timestamped inactive time periods.

11. A method of electro-optically reading targets, comprising the steps of:

illuminating an illuminated target with illumination light from an illuminator;

capturing return light from the illuminated target over a field of view of an imager, and generating electrical signals indicative of the captured return light;

energizing the illuminator and the imager with a controller to process the electrical signals into data indicative of the illuminated target;

adaptively reducing electrical power consumption of at least one of the illuminator and the controller based on system usage; and wherein the power reducing step is performed by controlling the controller to periodically deenergize the at least one of the illuminator and the controller in an idle mode in which no reading occurs at a variable frequency that decreases over time.

12. The method of claim 11, and configuring the illuminator with a plurality of light emitting diodes (LEDs).

13. The method of claim 11, and wherein the energizing step is performed during an active mode, and wherein the power reducing step is partially performed during an idle mode and more fully performed during a sleep mode, and configuring each mode with a plurality of states in each of which power is reduced to the at least one of the illuminator and the controller.

14. A method of electro-optically reading targets, comprising the steps of:
- illuminating an illuminated target with illumination light from an illuminator;
- capturing return light from the illuminated target over a field of view of an imager, and generating electrical signals indicative of the captured return light;
- energizing the illuminator and the imager with a controller to process the electrical signals into data indicative of the illuminated target;
- adaptively reducing electrical power consumption of at least one of the illuminator and the controller based on system usage; and
- wherein the power reducing step is performed by measuring inactive time periods between reading the targets, and by controlling the controller to periodically deenergize the at least one of the illuminator and the controller in an idle mode in which no reading occurs at a frequency that depends upon the measured inactive time periods.

15. The method of claim 14, and wherein the energizing step is performed during an active mode, and wherein the power reducing step is partially performed during an idle mode and more fully performed during a sleep mode, and configuring each mode with a plurality of states in each of which power is reduced to the at least one of the illuminator and the controller.

16. A method of electro-optically reading targets, comprising the steps of:
- illuminating an illuminated target with illumination light from an illuminator;
- capturing return light from the illuminated target over a field of view of an imager, and generating electrical signals indicative of the captured return light;
- energizing the illuminator and the imager with a controller to process the electrical signals into data indicative of the illuminated target;
- adaptively reducing electrical power consumption of at least one of the illuminator and the controller based on system usage; and
- wherein the power reducing step is performed by timestamping active time periods in which the targets are read and inactive time periods in which no targets are read over time, and by controlling the controller to periodically energize the illuminator and the controller during the timestamped active time periods, and to periodically deenergize the at least one of the illuminator and the controller during the timestamped inactive time periods.

17. The method of claim 16, and wherein the energizing step is performed during an active mode, and wherein the power reducing step is partially performed during an idle mode and more fully performed during a sleep mode, and configuring each mode with a plurality of states in each of which power is reduced to the at least one of the illuminator and the controller.

* * * * *

UNITED STATES PATENT AND TRADEMARK OFFICE
CERTIFICATE OF CORRECTION

| | | |
|---|---|---|
| PATENT NO. | : 7,980,470 B2 | Page 1 of 1 |
| APPLICATION NO. | : 12/288804 | |
| DATED | : July 19, 2011 | |
| INVENTOR(S) | : Madej et al. | |

It is certified that error appears in the above-identified patent and that said Letters Patent is hereby corrected as shown below:

In Column 2, Line 60, delete "in all" and insert -- in an --, therefor.

In Column 3, Line 29, delete "sensors" and insert -- sensor, --, therefor.

In Column 3, Line 52, delete "call be" and insert -- can be --, therefor.

In Column 7, Line 6, delete "steel)" and insert -- sleep --, therefor.

Signed and Sealed this
First Day of January, 2013

David J. Kappos
*Director of the United States Patent and Trademark Office*